(12) United States Patent
Pan et al.

(10) Patent No.: US 7,016,492 B2
(45) Date of Patent: Mar. 21, 2006

(54) MAGNETIC HINGE APPARATUS

(75) Inventors: Long-Jyh Pan, Shijr (TW); Yung-Tsun Hsieh, Changhua (TW)

(73) Assignee: Benq Corporation, Taoyuan Shien (TW)

( * ) Notice: Subject to any disclaimer, the term of this patent is extended or adjusted under 35 U.S.C. 154(b) by 469 days.

(21) Appl. No.: 10/392,262

(22) Filed: Mar. 18, 2003

(65) Prior Publication Data

US 2003/0179880 A1 Sep. 25, 2003

(30) Foreign Application Priority Data

Mar. 20, 2002 (TW) ............................ 91105311 A

(51) Int. Cl.
*H04M 1/00* (2006.01)

(52) U.S. Cl. ........................... 379/433.13; 455/575.03; 16/62; 16/342

(58) Field of Classification Search ........... 379/433.13; 455/575.03; 16/62, 342
See application file for complete search history.

(56) References Cited

U.S. PATENT DOCUMENTS 5,608,604 A * 3/1997 Francis ...................... 16/342
6,154,924 A * 12/2000 Woo ............................. 16/62

FOREIGN PATENT DOCUMENTS

TW 481397 11/2000

* cited by examiner

*Primary Examiner*—Ahmad F. Matar
*Assistant Examiner*—Quynh H. Nguyen
(74) *Attorney, Agent, or Firm*—Thomas, Kayden, Horstemeyer & Risley

(57) ABSTRACT

An apparatus for controlling a lifting cover open automatically, is applied in an electric product with a lifting cover. The apparatus includes a first magnetic device disposed on the main body of the electric product, a second magnetic device disposed on the lifting cover with respect to the first magnetic device, and a controlling device disposed on the main body for controlling switch on/off between the first magnetic device and power of the electric product. An inducing magnetic field is formed when the first magnetic device is connected to the power of the electric product, and the inducing magnetic field produces a repulsive force to the second magnetic device on the lifting cover so as to have the lifting cover open automatically.

15 Claims, 9 Drawing Sheets

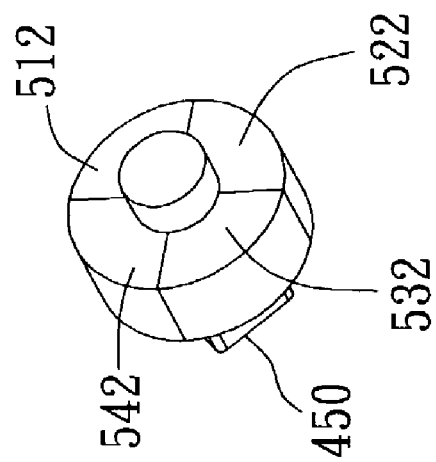
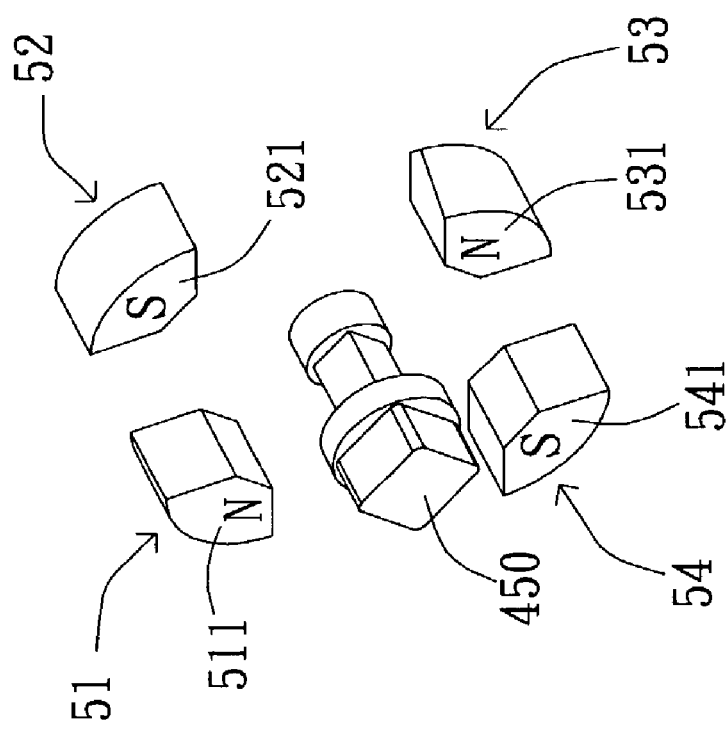
FIG. 7B
FIG. 7A

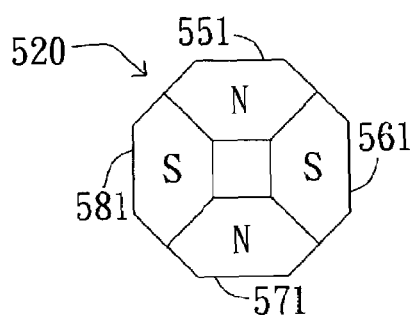 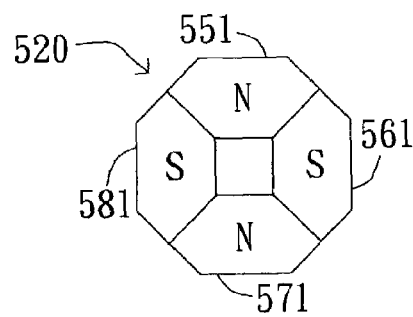
FIG. 8A  FIG. 8B
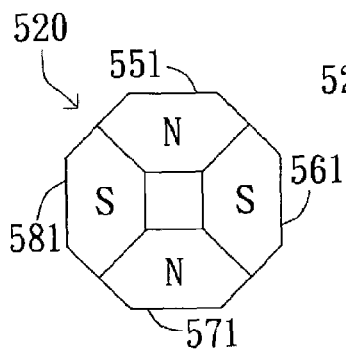 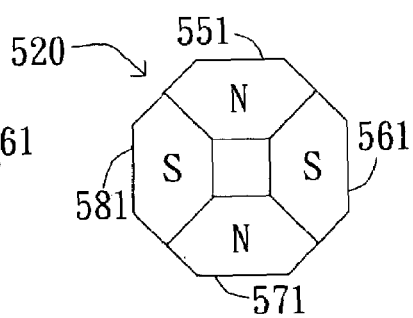 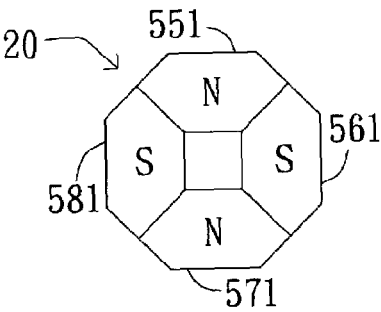
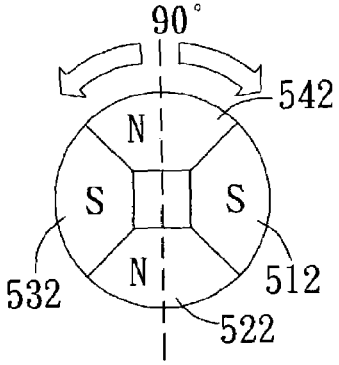 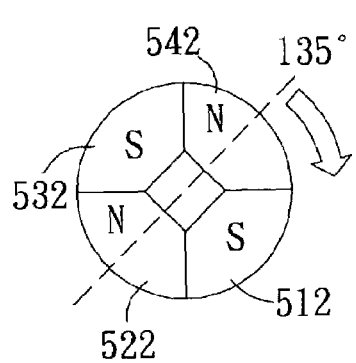 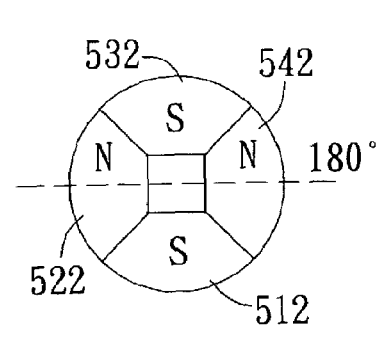
FIG. 8C  FIG. 8D  FIG. 8E

US 7,016,492 B2

MAGNETIC HINGE APPARATUS

This application claims the benefit of Taiwan application Serial No. 91105311, filed Mar. 20, 2002.

BACKGROUND OF THE INVENTION

1. Field of the Invention

The invention relates in general to a hinge apparatus, and in particular to a hinge apparatus utilizing magnetic components.

2. Description of the Related Art

Millions of people around the world use cellular phones. With such great gadgets, the owner can talk to anyone on the planet from just about anywhere. These days, cell phones provide an incredible array of functions, as well as a variety of the aesthetic appearances. The cell phones with or without their covers are generally sold in the commercial market, classifying the cell phones by appearance. Moreover, some models are designed as the folding type, in which the screen and the keypad are respectively on the folding part and the ground part. The cellular phone with cover is referred to as the "flip-type" phone from here on.

FIG. 1 is a perspective view of a flip-type cellular phone. The flip-type cellular phone 100 includes a phone body 120 and a flip cover 140, and a hinge apparatus connecting the two. The hinge apparatus, connecting the flip cover 140 and the phone body 120, allows the pivoting of the flip cover 140 on the phone body 120. The flip cover 140 is designed to protect the keypad from dust and careless touch. After the flip cover 140 is opened, the user can dial a number to make a call or receive/send an e-mail or message.

FIG. 2A is a drawing illustrating the motion of the flip cover of the cellular phone. With the special design, a critical angle exists in the rotation of the hinge apparatus 270. If the user desires to open the flip cover 140, the flip cover 140 will automatically rotate to the fully-opened position along the direction of B while the external force for opening the flip cover 140 disappears after the rotation angle is over the critical angle α. However, if the external force disappears before the rotation angle reaches the critical angle α, the flip cover 140 will automatically return to the fully-closed position along the direction of A. On the other hand, if the user wants to close the flip cover 140, it will automatically rotate to the fully-closed position along the direction of A while the external force for closing the flip cover 140 is removed after the rotation angle is smaller than the critical angle α. However, if the external force disappears before the rotation angle reaches the critical angle α, i.e., in the condition of the rotation angle greater than the critical angle α, the flip cover 140 will automatically return to the fully-opened position along the direction of B. Simply saying, the flip cover 140 is stably maintained at only two positions, as shown in FIG. 2B. Namely, the fully-closed flip cover 140 is maintained at the first stable equilibrium while the fully-opened flip cover 140 is maintained at the second stable equilibrium. The hinge apparatus 270 described above is adopted not only in the flip-type cellular phone, but also in the folding-type cellular phone.

This conventional hinge design, however, suffers from several drawbacks. After frequent usage, the conventional hinge, which typically uses a spring to provide the torsional force, will gradually lose the property of returning to the initial state following deformation, and the elastic force generated from the deformed spring is consequently decreased. Therefore, the issue of elasticity decay will shorten the utility life span of the hinge apparatus.

SUMMARY OF THE INVENTION

It is therefore an object of the invention to provide a magnetic hinge apparatus that overcomes the drawback of elasticity decay of the conventional hinge.

The invention achieves the above-identified object by providing a magnetic hinge apparatus for connecting a body portion and an active portion such as a flip cover. The magnetic hinge apparatus includes a hinge housing, a binge shaft, an immobilized magnetic device, and a rotatable magnetic device. The hinge housing has a cavity for receiving the immobilized magnetic device and the rotatable magnetic device. The immobilized magnetic device is firmly attached to the hinge housing, so that there is no relative mod on between the immobilized magnetic device and the hinge housing. The hinge shaft on which the rotatable magnetic device is assembled is inserted in the cavity. When the hinge housing rotates around the hinge shaft, the immobilized magnetic device is simultaneously rotated relatively to the rotatable magnetic device. The rotatable and immobilized magnetic devices are disposed as mates, and the opposite surfaces of the rotatable magnetic device and the immobilized magnetic device have the same polarity. Accordingly, the magnetic hinge apparatus is stably maintained at two equilibrium positions. When the magnetic hinge apparatus is maintained at the first stable equilibrium, the rotatable magnetic device is positioned at one side adjacent to the immobilized magnetic device. When the magnetic hinge apparatus is maintained at the second stable equilibrium, the rotatable magnetic device is positioned at the other side adjacent to the immobilized magnetic device.

Other objects, features, and advantages of the invention will become apparent from the following detailed description of the preferred but non-limiting embodiment. The following description is made with reference to the accompanying drawings.

BRIEF DESCRIPTION OF THE DRAWINGS

FIG. 7A is an exploded view of the rotatable magnetic device and the hinge shaft;

FIG. 7B is a back view of the rotatable magnetic device assembled on the hinge shaft;

FIG. 8A shows the relative positions of the rotatable magnetic device and the immobilized magnetic device, while the magnetic hinge apparatus is maintained at the first stable equilibrium;

FIG. 8B shows the relative positions of the rotatable magnetic device and the immobilized magnetic device, while the rotation angle is smaller than the critical angle;

FIG. 8C shows the relative positions of the rotatable magnetic device and the immobilized magnetic device, while the rotation angle is equal to the critical angle;

FIG. 8D shows the relative positions of the rotatable magnetic device and the immobilized magnetic device, while the rotation angle is larger than the critical angle;

FIG. 8E shows the relative positions of the rotatable magnetic device and the immobilized magnetic device, while the magnetic hinge apparatus is maintained at the second stable equilibrium;

DETAILED DESCRIPTION OF THE INVENTION

First Embodiment

Figure 1:
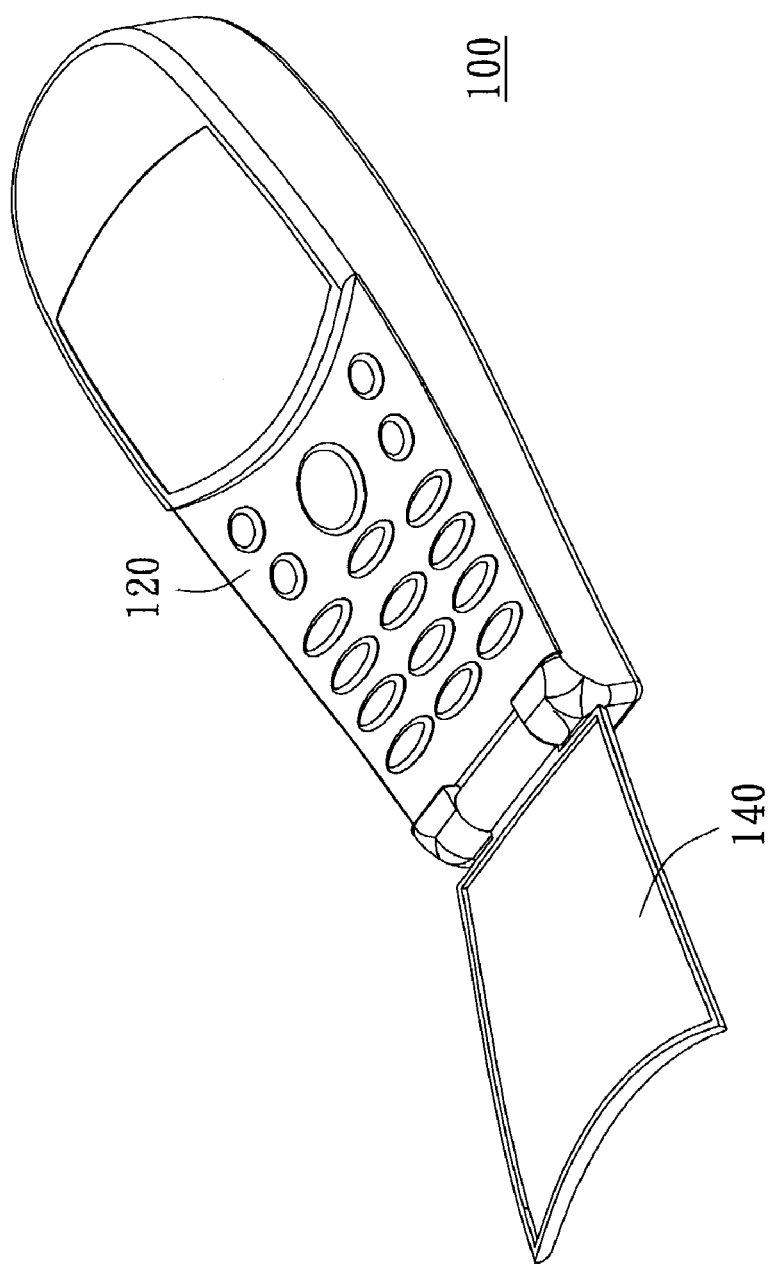
FIG. 1 (prior art) is a perspective view of a flip-type cellular phone.
Figure 2A:
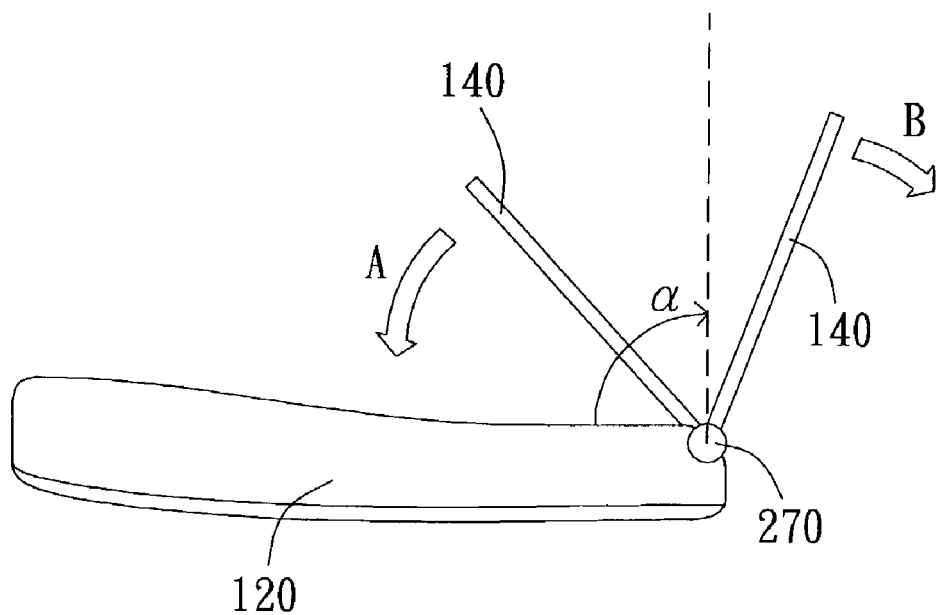
FIG. 2A (prior art) is a drawing illustrating the motion of the flip cover of the cellular phone.
Figure 2B:
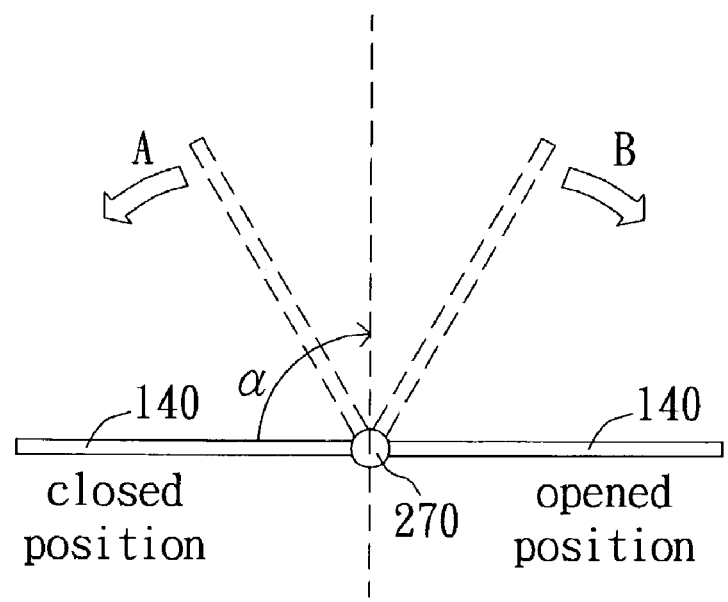
FIG. 2B (prior art) is a drawing illustrating the flip cover stably maintained at the fully-closed and fully-opened positions.
Figure 3:
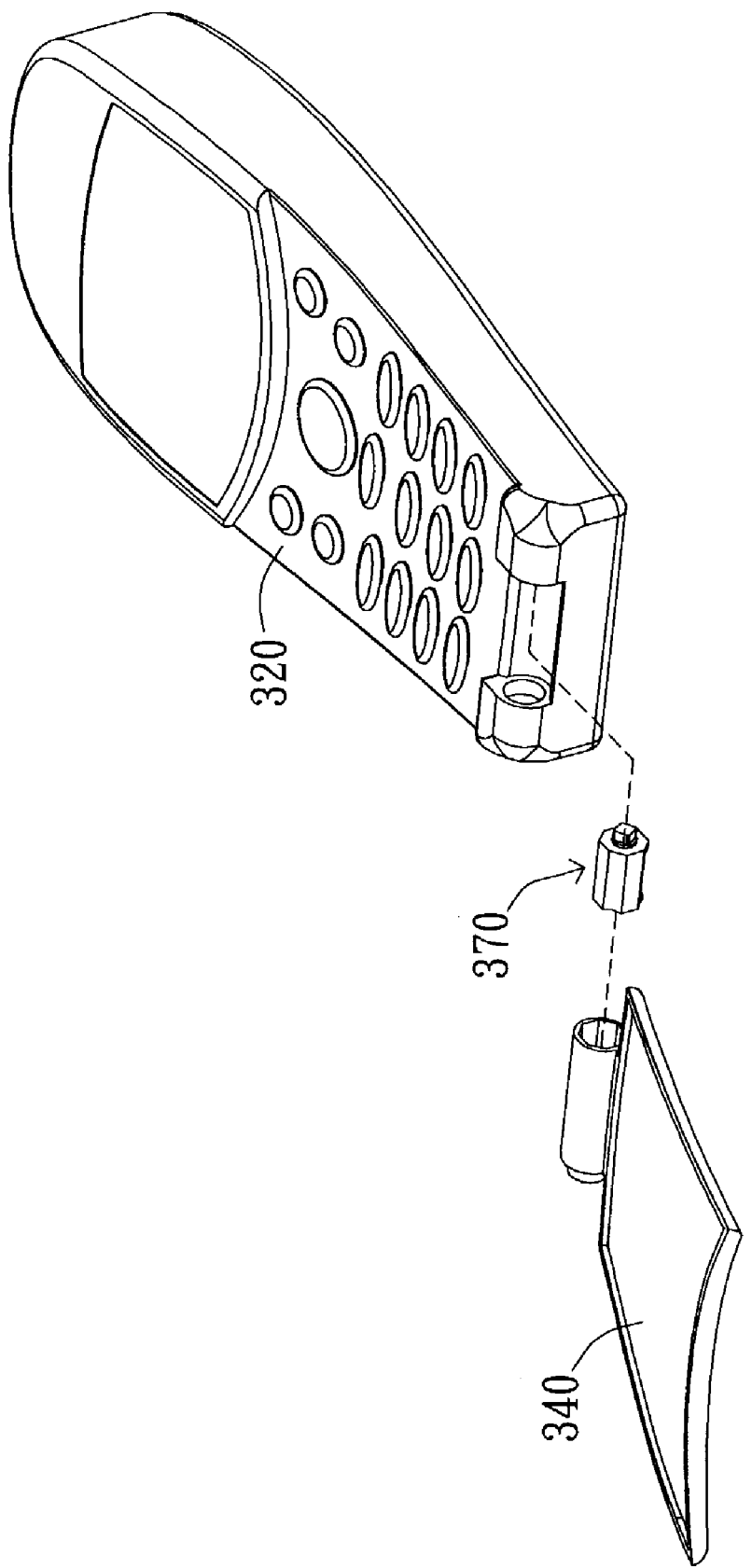
FIG. 3 is a drawing of a disassembled phone body, a flip cover, and a magnetic hinge according to the first embodiment of the invention.
Figure 4A:
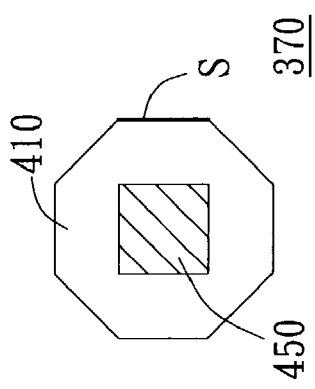
FIG. 4A is a side view of the magnetic hinge of FIG. 3 while the flip cover is maintained at the fully-closed position.
Figure 4B:
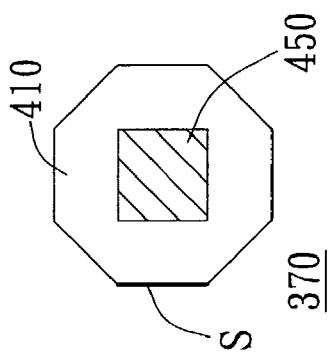
FIG. 4B is a side view of the magnetic hinge of FIG. 3 while the flip cover is maintained at the fully-opened position.

FIG. 3 is a drawing of a disassembled phone body, a flip cover, and a magnetic hinge according to the first embodiment of the invention. The phone body 320 and the flip cover 340 are connected by the magnetic hinge 370. While the flip cover 340 is rotated, the hinge housing is simultaneously rotated around the hinge shaft. The magnetic hinge 370 allows the pivoting of the flip cover 340 on the phone body 320, and the flip cover 340 can be maintained at the open or close position. FIG. 4A is a side view of the magnetic hinge of FIG. 3 while the flip cover is maintained at the fully-closed position. The magnetic hinge 370 mainly includes a bingo housing 410 and a hinge shaft 450, wherein the hinge housing 410 rotates around the hinge shaft 450. In the practical application, the hinge housing 410 can be connected to the flip cover 340, while the hinge shaft 450 can be connected to the phone body 320. After assembly, the rotation of the flip cover 340 can be performed. FIG. 4B is a side view of the magnetic hinge of FIG. 3 while the flip cover is maintained at the fully-opened position. Comparing FIG. 4A and FIG. 43, the side S of the binge housing 410 is turned for 180 degrees. It is noted that the conventional elastic recovery force is substituted by the magnetic force (attractive or repulsive force). Accordingly, the hinge apparatus of the invention has no issue of elasticity decay associated with frequent usage.

Figure 5:
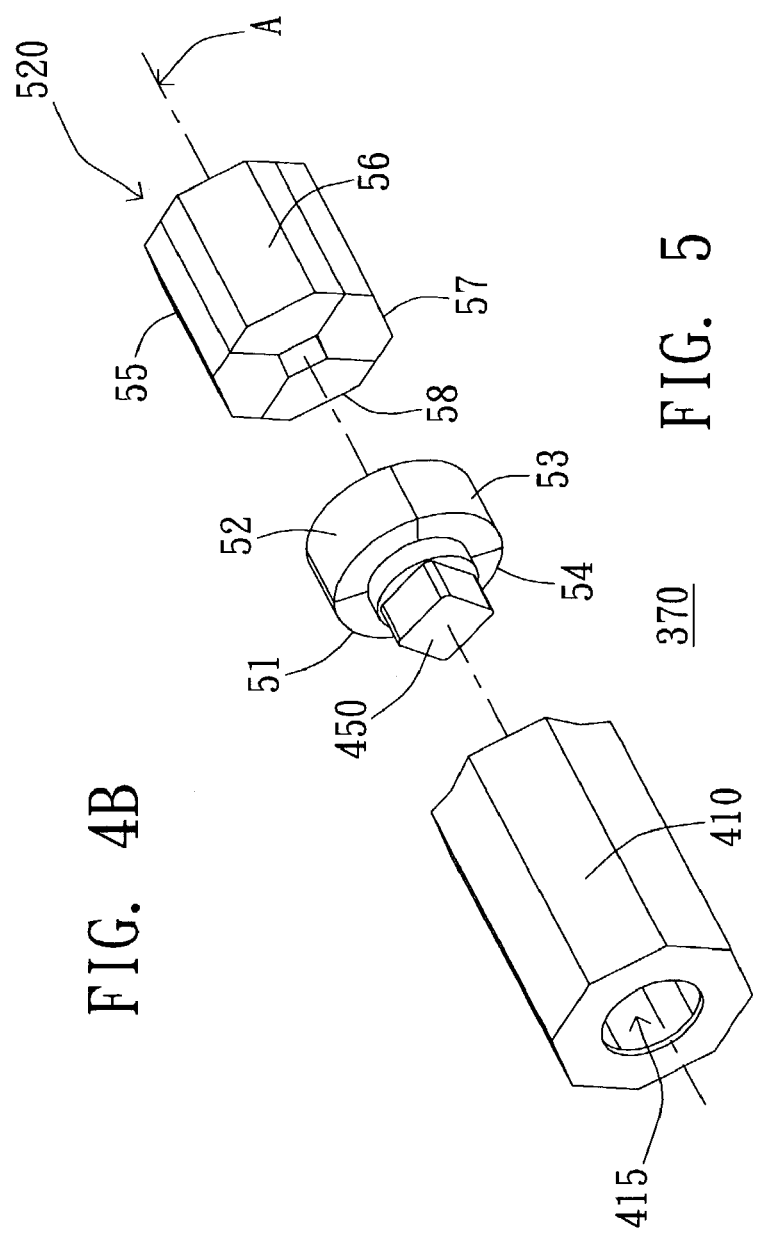
FIG. 5 is a drawing of the disassembled magnetic hinge according to the first embodiment of the invention.
Figure 6:
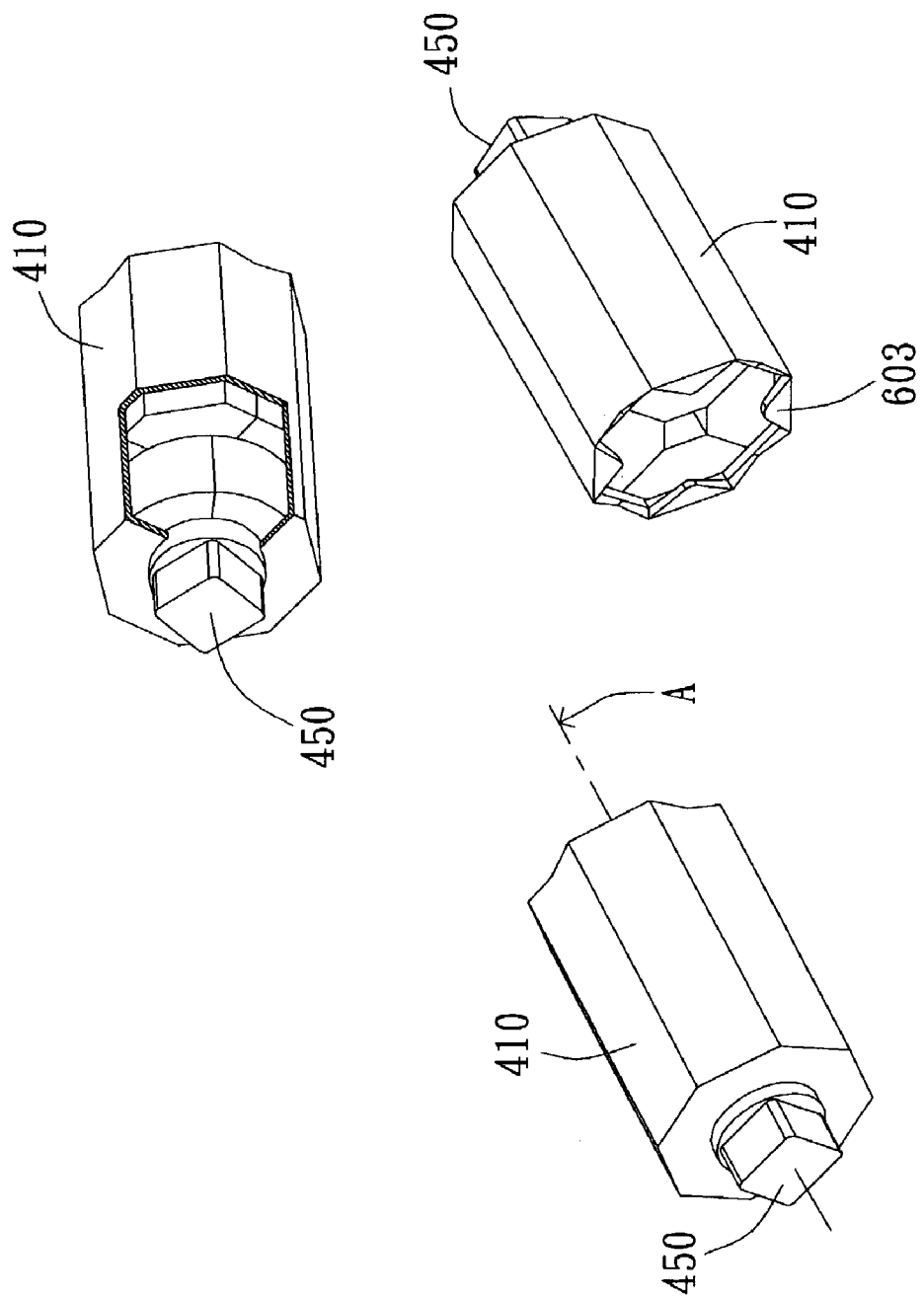
FIG. 6 is a perspective drawing of the assembled magnetic hinge according to the first embodiment of the invention.

FIG. 5 is a drawing of the disassembled magnetic hinge according to the first embodiment of the invention. The magnetic hinge 370 at least includes a hinge housing 410, a cavity 415, an immobilized magnetic device 520, and a rotatable magnetic device, wherein the immobilized magnetic device 520 and the rotatable magnetic device are received in the cavity 415. The rotatable magnetic device signifies that the relative motion can be generated between the hinge housing 410 and the rotatable magnetic device. The immobilized magnetic device 520 signifies that the relative motion cannot be generated between the hinge housing 410 and the immobilized magnetic device 520. In the practical application, the immobilized magnetic device 520 could be a group of magnets, such as the magnets 55, 56, 57 and 58. Also, the immobilized magnetic device 520 is situated inside the cavity 415, and rotated with the hinge housing 410 around the axis A. The rotatable magnetic device could be a group of magnets 51, 52, 53 and 54, assembled on the hinge shaft 450; consequently, it is connected to the phone body 320 through the hinge shaft 450. During assembly, the rotatable magnetic device is assembled onto the hinge shaft 450, and then placed inside the cavity 415. Afterward, the immobilized magnetic device 520 is inserted into the cavity 415. When the flip cover 340 is opened or closed, the flip cover 340 moves the hinge housing 410 and make the immobilized magnetic device 520 rotate relatively to the rotatable magnetic device. Accordingly, the hinge housing 410 can be maintained at two rotating angles by the magnet disposition of the rotatable magnetic device and the immobilized magnetic device 520. That is to say, the magnetic hinge can be positioned at the first stable state or the second stable state. FIG. 6 is a perspective drawing of the assembled magnetic hinge according to the first embodiment of the invention. In particular, a folding part 603, formed in the end of the hinge housing 410, is designed for preventing the immobilized magnetic device 520 from dropping out of the cavity 415.

FIG. 7A is six exploded view of the rotatable magnetic device and the hinge shaft. The magnets 51, 52, 53, and 54 constitute the rotatable magnetic device, and each magnet has two magnetic polarities. The adjacent surfaces of the magnets have relative polarities, so that the attractive force brings the four magnets together and assembled on the hinge shaft 450. For example, if the profile 511 (of the magnet 51) is determined to be a north (N) magnetic pole, then the profiles 521 (of the magnet 52), 531 (of the magnet 53), and 541 (of the magnet 54) are respectively a south (S), a north (N), and a south (S) magnetic poles. Since a magnet has a north and a south magnetic poles, the profiles 512 (of the magnet 51), 522 (of the magnet 52), 532 (of the magnet 53), and 542 (of the magnet 54) are respectively a south (S), a north (N), a south (S), and a north (N) magnetic poles, as shown in FIG. 7B, which is a back view of the rotatable magnetic device assembled on the hinge shaft.

The folding part (such as the flip cover 340) of cellular phone is designed to be semi-automatically opened or closed by the magnetic hinge apparatus of the invention. Accordingly, there is a critical angle in the rotation of the flip cover 340. When the flip cover and phone body are maintained in the closed condition, an external force is required to open the flip cover 340. If the external force disappears before the rotation angle of the flip cover 340 reaches the critical angle, the flip cover 340 will automatically return to the fully-closed position (the first stable equilibrium, such as at 0 degrees). If the external force disappears after the rotation angle of the flip cover 340 reaches the critical angle, the flip cover 340 will automatically go to the fully-opened position (the second stable equilibrium, such as at 180 degrees).

FIG. 8A shows the relative positions of the rotatable magnetic device and the immobilized magnetic device, while the magnetic hinge apparatus is maintained at the first stable equilibrium. In the foregoing description, the immobilized magnetic device 520 is a combination of the magnets 55, 56, 57, and 58. The magnetic poles 551, 561, 571, and 581 of the magnets 55, 56, 57, and 58 are arranged as shown in FIG. 8A. When the magnetic hinge apparatus is maintained at the first stable equilibrium, the magnetic poles 551 and 512, the magnetic poles 561 and 522, the magnetic poles 571 and 532, the magnetic poles 581 and 542, have opposite polarities arranged as mates. The attractive force maintains the rotatable magnetic device and the immobilized magnetic device at the first stable equilibrium; meanwhile, the hinge shaft of the rotatable magnetic device is located at the 0-degree position.

If the user opens the flip cover 340 to rotate the hinge housing 410 clockwise, the magnetic pole 542 will approach the pole 551 and be away from the pole 581. If the external force disappears, the repulsive force (between the poles 551 and 542) and the attractive force (between the poles 581 and 542) will drive the magnetic pole 542 back to the state of first stable equilibrium. FIG. 8B shows the relative positions of the rotatable magnetic device and the immobilized magnetic device, while the rotation angle is smaller than the critical angle. In FIG. 8B, 45-degree of rotation angle is taken for illustration, and the arrow denotes the rotating direction of the hinge housing 410 if the external force disappears. If the hinge housing 410 keeps rotating to 90 degrees as shown in FIG. 8C, the magnetic poles 551 and 542, the magnetic poles 561 and 512, the magnetic poles 571 and 522, the magnetic poles 581 and 532, having the same polarity are disposed oppositely. Meanwhile, the repulsive forces, as denoted by the direction of the arrows in FIG. 8C, make the rotatable magnetic device and immobilized magnetic device reach the maximum unstable state. If any force imbalance occurs, the rotatable magnetic device will be repelled to the clockwise or counterclockwise direction. Accordingly, 90-degree is the critical angle in the preferred embodiment.

If the external force is continuously applied to the hinge housing 410 to rotate the hinge housing 410 over the critical angle, then the magnetic pole 542 is repelled by the pole 551 and attracted by the pole 561. If the external force is terminated right now, then the magnetic pole 542 will keep rotating. FIG. 8D shows the relative positions of the rotatable magnetic device and the immobilized magnetic device, while the rotation angle is larger than the critical angle. In FIG. 8D, 135-degree of rotation angle is taken for illustration, and the arrow denotes the rotating direction of the hinge housing 410 while the external force disappears. Finally, the rotatable magnetic device and the immobilized magnetic device reach the second stable equilibrium; in the meanwhile, the magnetic poles 551 and 532, the magnetic poles 561 and 542, the magnetic poles 571 and 512, the magnetic poles 581 and 522, having opposite polarities are situated as mates. The hinge shaft is located at the 180-degree position (second stable equilibrium), as shown in FIG. 8E.

According to the description of the first embodiment, the housing 410 can be stably maintained at the 0-degree and 180-degree positions during rotation. Basically, if the hinge shaft and the housing are respectively connected to the phone body and the flip cover of the cellular phone, the cover can be semi-automatically opened or closed. Hence, the cellular phone possesses the snap characteristics, wherein the flip cover at a certain angle is snapped into the fully-opened or fully-closed position.

Second Embodiment

Figure 9:
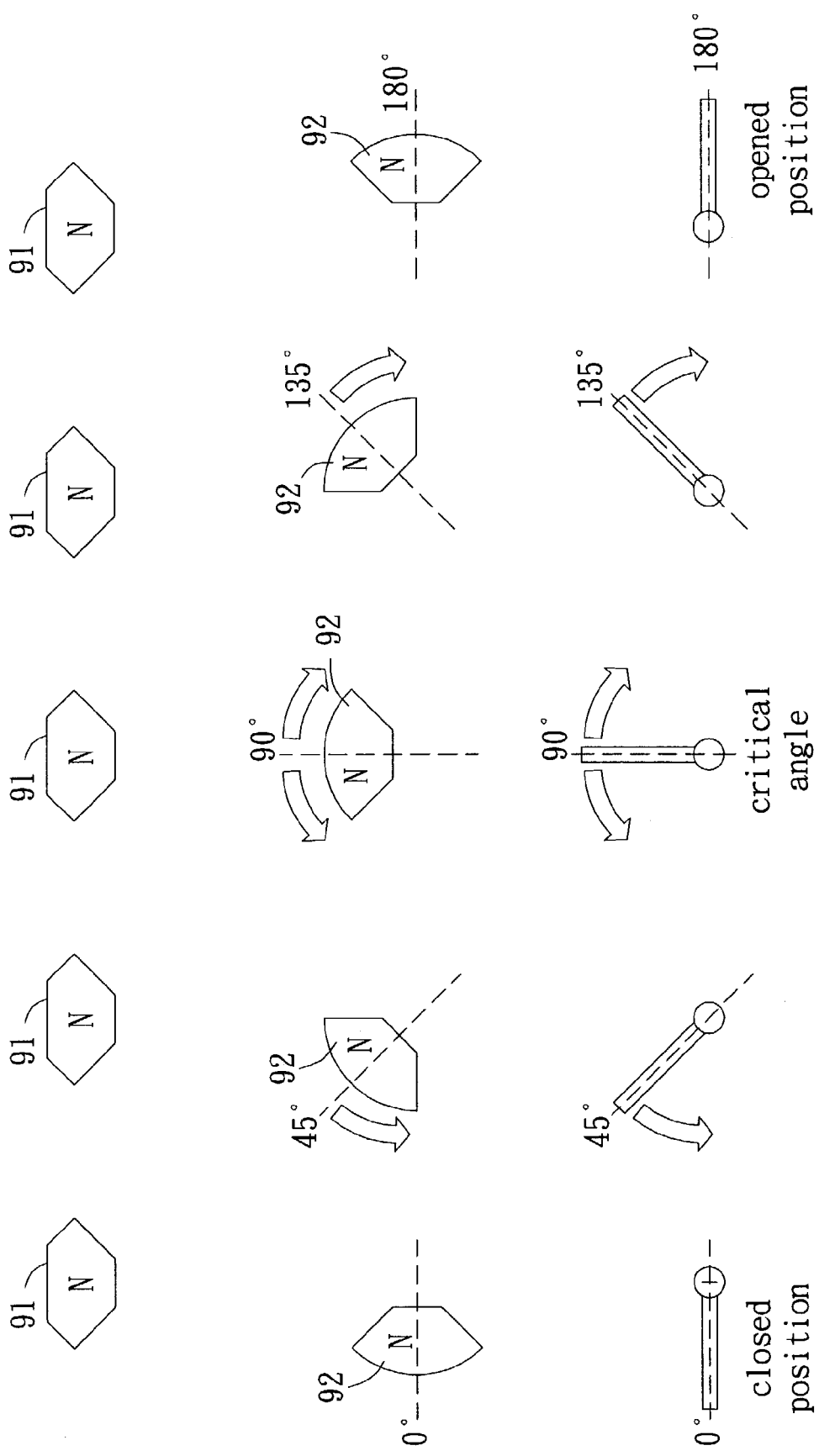
FIG. 9 is a schematic diagram of the immobilized magnetic device and the rotatable magnetic device according to the second embodiment of the invention.

The structure of the rotatable magnetic device and the immobilized magnetic device can be simplified. The second embodiment utilizing two magnets having the same polarity also achieves the objective of the invention. FIG. 9 is a schematic diagram of the immobilized magnetic device and the rotatable magnetic device according to the second embodiment of the invention. The immobilized magnetic device, such as the magnet 91, is assembled to the housing of the magnetic hinge apparatus. The rotatable magnetic device, such as the magnet 92, is assembled on the hinge shaft of the magnetic hinge apparatus. The magnets 91 and 92 have the same polarity (such as a north magnetic pole) and are set at the opposite sides. Also, the hinge shaft and the housing are connected to the phone body and the flip cover of the cellular phone, respectively. The hinge housing is simultaneously rotated around the hinge shaft while the flip cover is rotated. The magnetic hinge allows the pivoting of the flip cover on the phone body, and the flip cover can be maintained at the opened or closed position. It is assumed that the magnet 92 is located at the 0-degree position while the flip cover is closed. If the external force for opening the cover disappears before the cover reaches the critical angle such as 90 degrees (i.e. the cover opening angle is smaller than the critical angle), then the flip cover will return to the closed position due to the repulsive force between two magnets. If the external force for opening the cover disappears after the cover reaches the critical angle (i.e. the cover opening angle is larger than the critical angle), the flip cover will keep rotating to the fully-opened position due to the repulsive force between two magnets. The magnet 92 is located at the 180-degree position while the flip cover is completely opened. Simply saying, there are two stable states for the magnetic hinge apparatus. The first stable equilibrium occurs while the magnet 92 is located at the 0-degree position; meanwhile, the magnet 92 is positioned at one side adjacent to the magnet 91. The second stable equilibrium occurs while the magnet 92 is located at the 180-degree position; meanwhile, the magnet 92 is positioned at the other side adjacent to the magnet 91, as shown in FIG. 9.

Third Embodiment

Figure 10A:
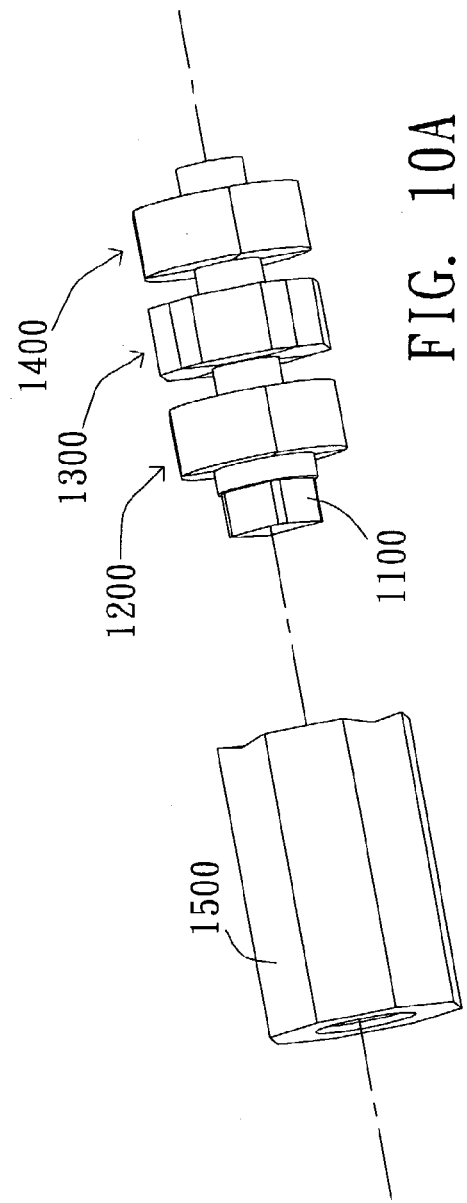
FIG. 10A is a drawing of the disassembled magnetic hinge according to the third embodiment of the invention.

FIG. 10A is a drawing of the disassembled magnetic hinge according to the third embodiment of the invention. The rotatable magnetic devices 1200 and 1400 and the immobilized magnetic device 1300 are assembled on the hinge shaft 1100. The rotatable magnetic device signifies that the relative motion can be generated between the hinge housing and the rotatable magnetic device. The immobilized magnetic device signifies that the relative motion cannot be generated between the hinge housing and the immobilized magnetic device. After assembly of each component, the hinge shaft 1100 is inserted into the cavity of the hinge housing 1500. The hinge housing 1500 is simultaneously rotated around the hinge shaft 1100 while the flip cover is opened; meanwhile, the immobilized magnetic device 1300 secured to the hinge housing 1500 is rotated relatively to the rotatable magnetic devices 1200 and 1400. By the suitable arrangement of magnetic poles of the hinge components, the hinge shaft 1100 will be stably positioned at two rotating angles.

Figure 10B:
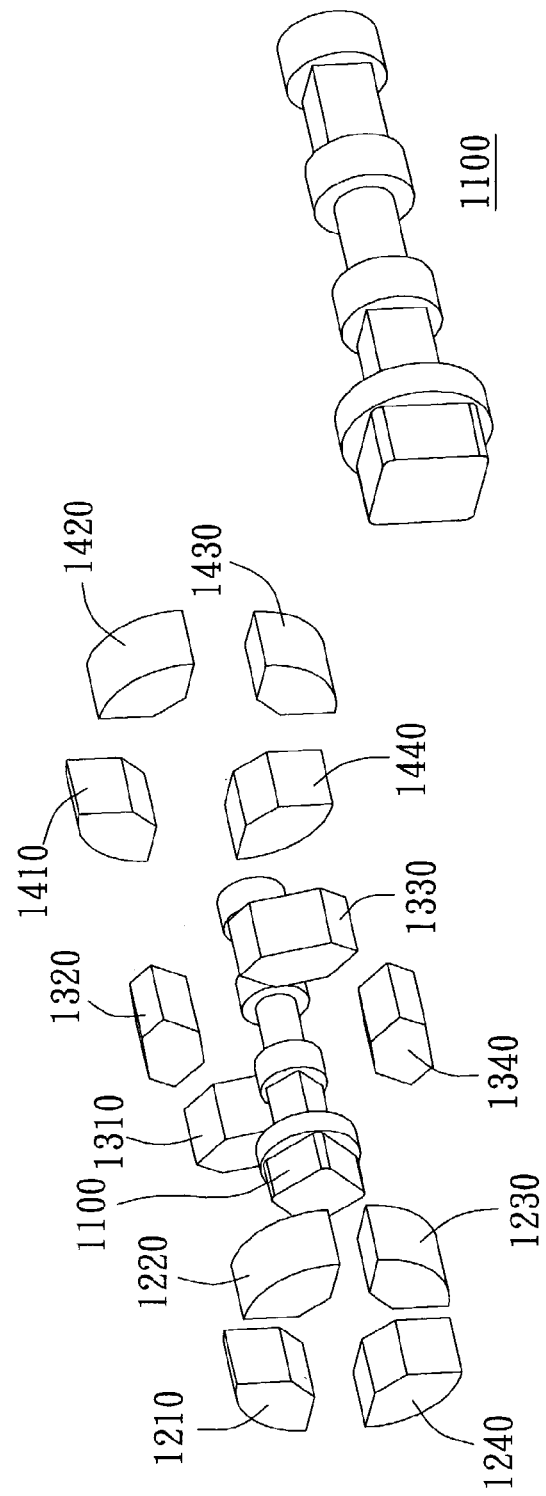
FIG. 10B is an exploded view of the hinge shaft, the rotatable magnetic device, and immobilized magnetic device of FIG. 10A.

FIG. 10B is an exploded view of the binge shaft, the rotatable magnetic device, and immobilized magnetic device of FIG. 10A. A combination of magnets 1210, 1220, 1230, and 1240 toting the rotatable magnetic device 1200. Similarly, a combination of magnets 1310, 1320, 1330, and 1340 forms the immobilized magnetic device 1300, while a combination of magnets 1410, 1420, 1430, and 1440 forms the rotatable magnetic device 1400. The magnetic poles of the magnets are arranged as the demonstration of the first embodiment. When the binge shaft 1100 is positioned at the first equilibrium, the magnets 1210 and 1410 are attracted to the magnet 1310, the magnets 1220 and 1420 are attracted to the magnet 1320, the magnets 1230 and 1430 are attracted to the magnet 1330, and the magnets 1240 and 1440 are attracted to the magnet 1340. Since the four magnets of each magnetic device are arranged according to a certain rule (i.e.

the adjacent magnets are attracted to each other), the hinge shaft 1100 can be positioned at the second equilibrium after a rotation of 180 degrees.

In the aforementioned description, the magnets used in these embodiments could be the permanent magnets, electromagnets, or other materials possessing magnetism.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A magnetic hinge apparatus, maintained at a first stable equilibrium or at a second stable equilibrium, comprising:
    a hinge housing having a cavity;
    a hinge shaft situated inside the cavity;
    an immobilized magnetic device assembled inside the hinge housing and situated inside the cavity; and
    a rotatable magnetic device fixed with the hinge shaft inside the cavity and rotatable to the immobilized magnetic device, the rotatable magnetic device being disposed with the immobilized magnetic device as mates, the opposite surfaces of the rotatable magnetic device and the immobilized magnetic device having the same polarity,
    wherein the rotatable magnetic device is positioned at one side adjacent to the immobilized magnetic device when the magnetic hinge apparatus is maintained at the first stable equilibrium, and the rotatable magnetic device is positioned at the other side adjacent to the immobilized magnetic device when the magnetic hinge apparatus is maintained at the second stable equilibrium.

2. The magnetic hinge apparatus according to claim 1, wherein the angle between the first stable equilibrium and the second stable equilibrium is about 180 degrees.

3. The magnetic hinge apparatus according to claim 1, wherein the rotatable magnetic device at least comprises a magnetic component.

4. The magnetic hinge apparatus according to claim 3, wherein the magnetic component is a magnet.

5. The magnetic hinge apparatus according to claim 4, wherein the magnet is a permanent magnet.

6. The magnetic hinge apparatus according to claim 4, wherein the magnet is an electromagnet.

7. The magnetic hinge apparatus according to claim 1, wherein the immobilized magnetic device at least comprises a magnetic component.

8. The magnetic hinge apparatus according to claim 7, wherein the magnetic component is a magnet.

9. The magnetic hinge apparatus according to claim 8, wherein the magnet is a permanent magnet.

10. The magnetic hinge apparatus according to claim 8, wherein the magnet is an electromagnet.

11. The magnetic hinge apparatus according to claim 1, wherein the hinge housing rotates around the hinge shaft so that the immobilized magnetic device rotates relatively to the rotatable magnetic device.

12. The magnetic hinge apparatus according to claim 1, wherein the hinge housing is connected to an active part.

13. The magnetic hinge apparatus according to claim 12, wherein the active part is a flip cover of a cellular phone.

14. The magnetic binge apparatus according to claim 1, wherein the hinge shaft is connected to a ground part.

15. The magnetic hinge apparatus according to claim 14, wherein the ground part is a phone body of a cellular phone.

\* \* \* \* \*